(12) United States Patent
Negishi et al.

(10) Patent No.: US 12,466,732 B2
(45) Date of Patent: Nov. 11, 2025

(54) METHOD FOR PRODUCING HALOGEN OXYACID SOLUTION

(71) Applicant: TOKUYAMA CORPORATION, Yamaguchi (JP)

(72) Inventors: Takayuki Negishi, Yamaguchi (JP); Takafumi Shimoda, Yamaguchi (JP); Akihiro Saito, Yamaguchi (JP); Naoki Matsuda, Yamaguchi (JP); Masayuki Moriwaki, Yamaguchi (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 876 days.

(21) Appl. No.: 17/618,762

(22) PCT Filed: Apr. 16, 2021

(86) PCT No.: PCT/JP2021/015751
§ 371 (c)(1),
(2) Date: Dec. 13, 2021

(87) PCT Pub. No.: WO2021/210682
PCT Pub. Date: Oct. 21, 2021

(65) Prior Publication Data
US 2022/0356061 A1   Nov. 10, 2022

(30) Foreign Application Priority Data
Apr. 17, 2020 (JP) ................. 2020-074063

(51) Int. Cl.
*C01B 11/04* (2006.01)
*C07C 209/68* (2006.01)

(52) U.S. Cl.
CPC ............ *C01B 11/04* (2013.01); *C07C 209/68* (2013.01)

(58) Field of Classification Search
None
See application file for complete search history.

(56) References Cited

U.S. PATENT DOCUMENTS

| | | |
|---|---|---|
| 4,963,232 A | 10/1990 | Kuriyama et al. |
| 2002/0060202 A1 | 5/2002 | Fukunaga et al. |
| | (Continued) | |

FOREIGN PATENT DOCUMENTS

| | | | |
|---|---|---|---|
| CN | 105016305 | * | 11/2015 |
| EP | 1840659 | * | 10/2007 |
| | (Continued) | | |

OTHER PUBLICATIONS

International Search Report (ISR) issued Jul. 6, 2021 in International (PCT) Application No. PCT/JP2021/015751.

(Continued)

Primary Examiner — Sheng H Davis
(74) Attorney, Agent, or Firm — Wenderoth, Lind & Ponack, L.L.P.

(57) ABSTRACT

A method for producing halogen oxyacid, which includes a step of continuously supplying and mixing an organic alkali solution and a halogen and continuously collecting a reaction solution containing halogen oxyacid, and an production apparatus of halogen oxyacid, which includes a reactor, a means of supplying an organic alkali solution to the reactor, a means of supplying a halogen to the reactor, and a means of collecting a reaction solution for taking out the reaction solution from the reactor, in which the organic alkali solution and the halogen are continuously supplied by the means of supplying an organic alkali solution and the means of supplying a halogen, respectively, to the reactor so as to be mixed therein such that a solution containing halogen oxyacid is generated as a reaction solution, and the reaction (Continued)

solution is continuously collected by the means of collecting a reaction solution are provided.

10 Claims, 1 Drawing Sheet

(56) References Cited

U.S. PATENT DOCUMENTS

| | | |
|---|---|---|
| 2005/0176603 A1 | 8/2005 | Hsu |
| 2010/0093931 A1 | 4/2010 | Rempel et al. |
| 2020/0017359 A1* | 1/2020 | Geis .......................... C01B 7/01 |
| 2021/0309942 A1 | 10/2021 | Shimoda et al. |

FOREIGN PATENT DOCUMENTS

| | | |
|---|---|---|
| JP | 56-48442 | 11/1981 |
| JP | 5-55445 | 8/1993 |
| JP | 2002-161381 | 6/2002 |
| JP | 2003-119494 | 4/2003 |
| JP | 2005-227749 | 8/2005 |
| JP | 2008-285565 | 11/2008 |
| JP | 2009-81247 | 4/2009 |
| JP | 2010-31277 | 2/2010 |
| JP | 2012-188327 | 10/2012 |
| WO | 2019225541 | * 11/2019 |

OTHER PUBLICATIONS

Office Action and Search Report issued Jun. 10, 2023, in corresponding Chinese Patent Application No. 202180017960.7, with English machine translation.
Denbigh et al., Chemical Reactor Theory an Introduction, 2nd Ed., (Jan. 31, 1980), pp. 3-4 (concise description of relevance provided on, for example, pp. 5, 8, and 12 of English translation of Ref. CA).
Office Action issued Feb. 1, 2022 in Japanese Patent Application No. 2021-156931, with English-language translation.

* cited by examiner

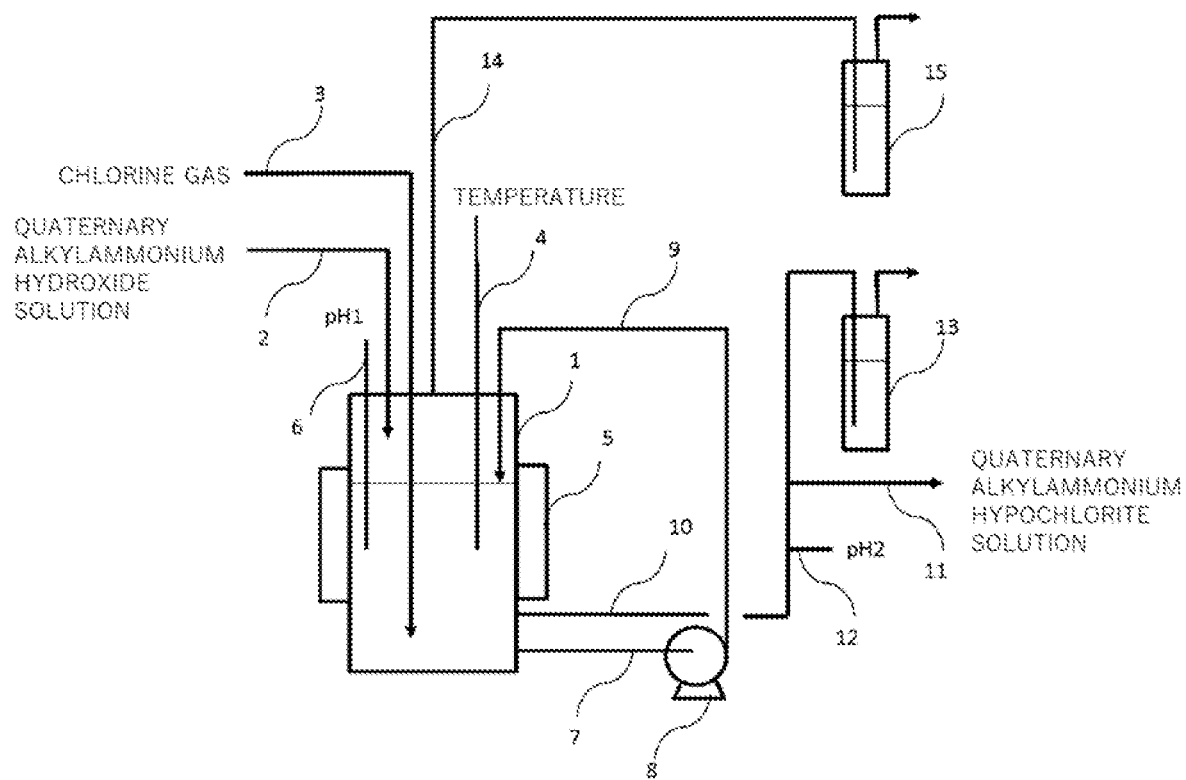

METHOD FOR PRODUCING HALOGEN OXYACID SOLUTION

TECHNICAL FIELD

The present invention relates to a method for producing a halogen oxyacid solution, for example, a quaternary alkylammonium hypochlorite solution. More specifically, the present invention provides an apparatus and a method of industrially advantageously producing a halogen oxyacid solution such as a quaternary alkylammonium hypochlorite solution having excellent storage stability.

BACKGROUND ART

In recent years, the design rules of semiconductor devices have become finer, and the requirements for impurity control in the semiconductor device manufacturing step have become more stringent. Impurities generated in the manufacturing step of a semiconductor device differ for each manufacturing step, so it is important to identify the pollution source for each manufacturing step and control the concentration of the impurities that are the pollution source.

Further, in order to improve the manufacturing efficiency of semiconductor elements, semiconductor wafers having a large diameter of more than 300 mm are used. In a semiconductor wafer having a large diameter, the area of the end face portion or the back face portion where an electronic device is not formed is larger than that of a semiconductor wafer having a small diameter. Therefore, in the step of forming metal wiring or the step of forming a barrier metal, a metal wiring material, or a barrier metal material (hereinafter sometimes collectively referred to as "metal material or the like") is likely to adhere not only to the surface portion of the semiconductor wafer on which the semiconductor device is formed but also to the end face portion and the back surface portion. As a result, the amount of excess metal material or the like adhering to the end face portion and the back surface portion of the large-diameter semiconductor wafer is increased compared with the small-diameter wafer.

The excess metal material or the like adhering to the end face portion and back surface portion of the semiconductor wafer contaminates the inside of production apparatus as particles of a metal or metal oxide, causing cross-contamination in the washing step with oxygen and the dry etching step with plasma, which are steps after metal wiring and barrier metal formation. Therefore, it is necessary to remove the metal material or the like adhering to the end face portion and the back surface portion before bringing them into the next step.

Among such metal materials, precious metals represented by platinum and ruthenium are difficult to be oxidized, dissolved, and removed in the subsequent etching step and cleaning step. Therefore, it is preferable to remove these precious metals from the semiconductor wafer in preference to other metal materials. In particular, ruthenium is often used as a wiring material in a case where the semiconductor device design rule is 10 nm or less because the resistance value can be reduced as compared with a case where copper is used as the wiring material. Therefore, ruthenium is desired to be quickly removed from unnecessary portions.

Usually, a cleaning method using a hypochlorite having high oxidizing power as a cleaning liquid for semiconductor wafers has been proposed. Specifically, a method using an aqueous solution of sodium hypochlorite has been proposed (see Patent document 1 and 2).

However, in the method of using the sodium hypochlorite aqueous solution as the cleaning liquid, sodium ions contained in the cleaning liquid inevitably increase. As a result, sodium ions are likely to adhere to the semiconductor wafer or the like, which may reduce the semiconductor production efficiency.

Meanwhile, a cleaning liquid using a hypochlorous acid solution containing no sodium as an essential component (see Patent document 3) or a quaternary alkylammonium hypochlorite solution (see Patent document 4) has also been developed.

However, these cleaning liquids using hypochlorous acid (see Patent document 3) are used for cleaning substrates provided with metal films or metal oxide films and are not particularly intended for removing precious metals. Therefore, they are not suitable for removing metals such as precious metals/metal oxide films thereof.

Meanwhile, a cleaning liquid containing an aqueous solution of tetramethylammonium hypochlorite described in Patent document 4 is also a cleaning liquid used for cleaning photoresists and residues, and thus, ruthenium-containing metal coatings of copper or aluminum are not targeted for cleaning. Specifically, in the Examples, it is shown that metal films are difficult to be etched. Patent document 5 shows excellent storage stability and etching performance by optimizing the pH of a quaternary alkylammonium hypochlorite solution.

PRIOR ART DOCUMENTS

Patent Document

Patent document 1: Japanese Patent Laid-Open No. 2002-161381

Patent document 2: Japanese Patent Laid-Open No. 2009-081247

Patent document 3: Japanese Patent Laid-Open No. 2003-119494

Patent document 4: Japanese Patent Laid-Open No. 2005-227749

Patent document 5: WO2019/225541

SUMMARY OF INVENTION

Technical Problem

Patent document 5 discloses batch-type reaction conditions in a method of producing a quaternary alkylammonium hypochlorite solution. However, as for an apparatus of producing the same, only a batch reactor is shown as an example while details of the production apparatus and producing method in the case of industrial mass production are not shown, and thus, the development of a more efficient producing method has been required.

Therefore, an object of the present invention is to provide a method and an apparatus of industrially advantageously producing a halogen oxyacid solution by reacting an organic alkali solution with a halogen.

Solution to Problem

The present inventors have conducted studies in order to achieve the above object. As a result, a method and an apparatus of industrially producing halogen oxyacid more stably and efficiently than methods and apparatuses using batch reactions by continuously supplying an organic alkali solution and a halogen to a reactor that mixes the organic alkali solution and the halogen while continuously collecting a reaction solution using a reaction solution collecting means provided to the reactor are provided.

That is, the present invention includes the following gist.

Aspect 1. A method for producing a halogen oxyacid, which comprises a step of continuously supplying and mixing an organic alkali solution and a halogen and continuously collecting a reaction solution containing halogen oxyacid generated.

Aspect 2. The producing method according to Aspect 1, wherein an amount of the reaction solution which is continuously collected corresponds to an amount of the organic alkali solution and the halogen which are continuously supplied.

Aspect 3. The producing method according to Aspect 1 or 2, which comprises a filtration step of filtering the reaction solution containing the halogen oxyacid.

Aspect 4. The producing method according to any one of Aspects 1 to 3, which comprises a storage step of storing the reaction solution containing halogen oxyacid.

Aspect 5. The producing method according to any one of Aspects 1 to 4, wherein a pH of the organic alkali solution at 25° C. is 10.5 or more to 14.5 and less.

Aspect 6. The producing method according to Aspect 4, wherein a pH at 25° C. during storage in the storage step is 12.0 or more to less than 14.0.

Aspect 7. The producing method according to any one of Aspects 1 to 6, wherein the organic alkali is onium hydroxide, and the halogen oxyacid is onium halogen oxyacid.

Aspect 8. The producing method according to Aspect 7, wherein the onium hydroxide is quaternary ammonium hydroxide, and the onium halogen oxyacid is quaternary ammonium hypohalite.

Aspect 9. The producing method according to Aspect 8, wherein the quaternary ammonium hydroxide is tetramethylammonium hydroxide, and the quaternary ammonium hypohalite is tetramethylammonium hypohalite.

Aspect 10. The producing method according to any one of Aspects 1 to 9, wherein the halogen is chlorine, bromine, hypochlorous acid, hypobromous acid, chlorous acid, bromous acid, chloric acid, or bromic acid.

Aspect 11. An production apparatus of halogen oxyacid, which comprises a reactor, a means of supplying an organic alkali solution to the reactor, a means of supplying a halogen to the reactor, and a means of collecting a reaction solution for taking out the reaction solution from the reactor, wherein the organic alkali solution and the halogen are continuously supplied by the means of supplying an organic alkali solution and the means of supplying a halogen, respectively, to the reactor so as to be mixed therein such that a solution containing halogen oxyacid is generated as a reaction solution, and the reaction solution is continuously collected by the means of collecting a reaction solution.

Aspect 12. The production apparatus according to Aspect 11, wherein the organic alkali is onium hydroxide, and the halogen oxyacid is onium halogen oxyacid.

Aspect 13. The production apparatus according to Aspect 11 or 12, which further comprises a reaction solution circulation means for returning a part of the reaction solution collected by the means of collecting a reaction solution to the reactor.

Aspect 14. The production apparatus according to any one of Aspects 11 to 13, wherein an amount of the reaction solution collected by the means of collecting a reaction solution corresponds to an amount of the organic alkali supplied by the means of supplying an organic alkali and the halogen supplied by the means of supplying a halogen.

Aspect 15. The production apparatus according to any one of Aspects 11 to 14, which further comprises at least one of a means of measuring pH of the reaction solution in the reactor, a means of reaction temperature control in the reactor, and a means of measuring a temperature in the reactor.

Aspect 16. The production apparatus according to any one of Aspects 11 to 15, wherein the means of supplying a halogen is provided with a sparger that is placed in the reactor so as to promote mixing of the organic alkali solution and the halogen.

Aspect 17. The production apparatus according to any one of Aspects 11 to 16, wherein a pH of the reaction solution collected from the reactor at 25° C. is from 12.0 to 13.8.

Aspect 18. The production apparatus according to any one of 11 to 17, wherein a pH of the reaction solution containing onium halogen oxyacid in the reactor at 25° C. is from 10.5 to 14.5.

Aspect 19. The production apparatus according to any one of Aspects 11 to 18, wherein a volume of the reactor is such that a liquid residence time of the organic alkali solution is maintained at from 0.1 to 120 min.

Aspect 20. The production apparatus according to any one of Aspects 11 to 19, wherein the halogen is chlorine, bromine, hypochlorous acid, hypobromous acid, chlorous acid, bromous acid, chloric acid, or bromic acid.

Aspect 21. The production apparatus according to any one of Aspects 11 to 20, wherein an inner surface of the reactor is formed with an organic polymer material.

Effects of Invention

The organic alkali solution and halogen are continuously supplied to the reactor, and the reaction solution containing the generated halogen oxyacid is continuously collected by using the collecting means installed in the reactor. Thus, in the mixed solution in the reactor, the concentration, pH, and other conditions of the organic alkali as a starting material and the generated halogen oxyacid are kept constant in a steady state. As a result, side reactions and the like are suppressed, and halogen oxyacid can be stably obtained. In addition, the continuous supply of starting materials and the continuous collection of reaction products allow the achievement of industrial mass production.

BRIEF DESCRIPTION OF DRAWINGS

FIG. 1 is a schematic view showing one aspect of the production apparatus according to the embodiment of the present invention.

DESCRIPTION OF EMBODIMENTS

<Method for Producing Halogen Oxyacid>
(Reaction Mode)

Next, the greatest feature of the present embodiment is to adopt a mode in which an organic alkali solution and a halogen are continuously supplied, and a reaction solution containing the generated halogen oxyacid is continuously collected. In a preferable aspect, the reaction solution containing halogen oxyacid is continuously collected so as to collect an amount corresponding to the amount of the organic alkali solution and the halogen which are continuously supplied. The corresponding amount means an amount equal to or proportional to the total amount of the supplied organic alkali solution and halogen (total amount of organic alkali and halogen >collected amount; both by volume). The same applies to the production apparatus described later.

In the present invention, "continuous" does not only mean that it is always constantly continuous but also means that it is stopped once and then intermittently performed after a certain period of time. It also means excluding the so-called batch-type reaction mode.

It is preferable to keep constant for the amount of organic alkali and halogen oxyacid generated, which are components in the reactor in the steady state, and the pH of the reaction solution in the reactor. In a preferable aspect, the supply amount is adjusted accurately.

The conventional batch-type reaction mode is a process in which halogen is added to an organic alkali solution charged in a reactor. Thus, the pH of the reaction solution at the initial stage of the reaction tends to be high, and at a high pH, the decomposition of halogen oxyacid is likely to occur. In the halogen oxyacid generated in a high pH range, a decomposition product generated by the decomposition of the halogen oxyacid is produced, so that there is a problem in storage stability. Meanwhile, in a case where the organic alkali solution and the halogen are continuously supplied, and the reaction solution is collected continuously, the reaction solution in the reactor becomes a steady state after a certain period of time, and the pH is kept constant. Thus, the decomposition of halogen oxyacid that has become stable is suppressed.

According to the producing method according to the embodiment of the present invention, it is possible to prevent the reaction solution from being kept at a high pH. The pH in the present invention is a value at 25T unless otherwise specified.

In addition, keeping the amount of the reaction solution in the reactor constant is a preferable aspect. It is preferable to install a collection outlet on the side of the reactor such that the reaction solution can be collected by overflow, to measure the height of the liquid level in the reactor and adjust the amount of the reaction solution collected such that the liquid level becomes constant, or to weigh the reactor containing the reaction solution such that the weight is constant, thereby adjusting the amount of the reaction solution collected such that the liquid level in the reactor is constant.

As described above, a mode is adopted in which the organic alkali and the halogen are continuously supplied, and the increased reaction solution which is increased accompanying with the solution containing halogen oxyacid generated, is continuously collected. Accordingly, the liquid residence time at high pH, which causes the largest side reaction of this reaction, can be reduced. In a case where chlorine gas or chlorine is used as the halogen; as a result, the chlorine yield can be maintained high. The chlorine yield described herein can be determined from the ratio (%) of the number of moles of generated hypochlorite ions to the number of moles of supplied chlorine molecules. In a case where all the added chlorine has reacted (no decomposition has occurred), the chlorine yield is 100%. In a case where hypochlorite ions are decomposed during the reaction, the chlorine yield decreases.

The continuous supply of the organic alkali and the halogen into the reactor is preferably performed at a constant rate. The supply at a constant rate means that the supply speed is constant. Further, the continuous collection of the reaction solution does not have to start at the same time as the start of the implementation of the producing method according to the embodiment of the present invention and can be performed after the pH of the reaction solution in the reactor becomes constant.

In addition, in a preferable aspect, the pH levels of the components in the reactor and the reaction solution are made uniform. In the reactor, the pH of the reaction solution of the organic alkali and the halogen supplied is preferably from 10.5 to 14.5. It is more preferable that the pH of the reaction solution of the organic alkali solution and the halogen is from 10.5 to 13.8. It is still more preferable that the pH of the reaction solution of the organic alkali solution and the halogen is from 12.0 to 13.8.

The pH of the reaction solution collected from the reactor is preferably from 12.0 to 13.8. The expression "from A to B" used herein for the numerical values A and B means "A or more and B or less" unless otherwise specified. In a case where a unit is attached only to the numerical value B in such an expression, the unit shall be applied to the numerical value A as well.

The reaction solution in the reactor is preferably stirred uniformly. As a method of stirring the reaction solution uniformly, a stirrer type method using a magnet, a circulation method using a reaction solution circulation means, or the like is generally adopted. In a case where the reaction solution is used as a semiconductor chemical liquid, it is necessary to reduce the contamination of particles, metal components, and the like as much as possible. For the purpose of reducing the contamination from the drive unit, a method using liquid circulation using a means of circulating a reaction solution is preferable. The means of circulating a reaction solution will be described later. For example, a method of returning a part of the reaction solution collected by a means of collecting a reaction solution to the reactor by using a pump can be exemplified.

In addition, the volume of the reactor becomes a factor of side reactions in addition to the fact that the apparatus becomes larger when the residence time of the reaction solution in the reactor is lengthened. Therefore, the value obtained by dividing the volume of the reactor by the volume of the organic alkali solution supplied to the reactor per hour is defined as the liquid residence time. In a preferable aspect, the volume of the reactor is such that the liquid residence time is from 1 to 120 min. It is more preferably from 1 to 100 min.

(Organic Alkali Solution)

The organic alkali solution supplied to the reactor can be either an aqueous solution in which an organic alkali is dissolved in water or a solution in which an organic alkali is dissolved in a non-aqueous solvent. The organic alkali solution can be obtained by dissolving an organic alkali in water or a non-aqueous solvent or diluting a commercially available organic alkali solution to the desired concentration. Examples of the non-aqueous solvent include known organic solvents capable of dissolving organic alkalis. Specific examples thereof include alcohol and glycol, and methanol and propylene glycol are particularly preferable. Among these solvents, water is preferable as the solvent because it is industrially easily available, and a high-purity organic alkali solution can be obtained. The concentration of the organic alkali solution is not particularly limited, but when the concentration of the organic alkali becomes high, a salt is precipitated and becomes a solid. Therefore, the concentration of the organic alkali solution is preferably from 0.01% to 30% by mass, more preferably from 0.05% to 27.5% by mass, and still more preferably from 0.1% to 25% by mass.

The organic alkali solution to be prepared contains carbon dioxide, which is usually derived from the atmosphere. Carbon dioxide is present in the solution in the form of carbonate ions or bicarbonate ions. The carbon dioxide concentration is not particularly limited, but is 0.001 ppm or more and 500 ppm or less, more preferably 0.005 ppm or more and 300 ppm or less, and still more preferably 0.01 ppm or more and 100 ppm or less (based on mass) in terms of carbonate ions. When the concentration of carbon dioxide contained in the organic alkali solution is 0.001 ppm or more and 500 ppm or less, the pH change of the obtained halogen oxyacid solution can be suppressed. As a result, the storage stability of the halogen oxyacid solution can be improved. Commercially available organic alkali solutions having such a carbon dioxide concentration can be used.

As the solvent for preparing the organic alkali solution, an aqueous solution using only water as a solvent can be prepared, a non-aqueous solution can be prepared by mixing the organic alkali solution with an organic solvent, or an aqueous solution and an organic solvent can be mixed. The solvent can be appropriately changed according to the use of the solution containing halogen oxyacid and the object to be cleaned. For example, when the object to be cleaned is ruthenium, the solvent can be prepared as an organic alkali aqueous solution because sufficient cleaning is possible with only water as the solvent.

In the present embodiment, the organic alkali solution is preferably a solution of onium hydroxide. Examples of onium hydroxide include ammonium hydroxide, phosphonium hydroxide, sulfonium hydroxide, iminium hydroxide containing multiple bonds, and diazenium hydroxide. Of these, a solution of ammonium hydroxide in which a large amount of a relatively stable compound is present is more preferable. Further, the above-described solution of onium hydroxide is preferably an aqueous solution of onium hydroxide. Further, the above-described solution of ammonium hydroxide is preferably a quaternary alkylammonium hydroxide solution.

The quaternary alkylammonium hydroxide solution is preferably a solution of quaternary alkylammonium hydroxide having an alkyl group having 1 to 10 carbon atoms, and more preferably a solution of quaternary alkylammonium hydroxide having an alkyl group having 1 to 5 carbon atoms. Specific examples of quaternary alkylammonium hydroxide include tetramethylammonium hydroxide, tetraethylammonium hydroxide, tetrabutylammonium hydroxide, and choline. These quaternary alkylammonium hydroxides can be used singly or in a combination of two or more. In addition, the four alkyl groups contained in quaternary alkylammonium hydroxide can have the same or different number of carbon atoms.

The various conditions described above and below, for example, the concentration range of organic alkali in the organic alkali solution supplied to the reactor, the pH range thereof, the concentration range of organic alkali in the reaction solution, the pH range thereof, and the like are applicable to any of the above specific examples of organic alkalis.

(Step of Producing Reaction Solution Containing Halogen Oxyacid by Mixing Organic Alkali Solution and Halogen)

In a step of producing a reaction solution containing a halogen oxyacid by mixing an organic alkali solution and a halogen and reacting them, the pH of the reaction solution containing the halogen oxyacid generated in the reactor tends to decrease. In consideration of the conditions of the filtration step described later and the solubility of the organic alkali, the lower limit of the pH of the organic alkali solution as a starting material is 10.5 or more, preferably 11.0 or more, more preferably 11.5 or more, and particularly preferably more than 12.0 in the present embodiment. The upper limit of the pH of the organic alkali solution is determined by the concentration of the organic alkali. As an example of the upper limit of the pH of the organic alkali solution, a pH of 14.5 or less can be exemplified.

In addition, it is preferable that the organic alkali solution used in the present embodiment contains metals, specifically sodium, potassium, aluminum, magnesium, iron, nickel, copper, silver, cadmium, and lead, with a content of 0.01 ppb or more and 20 ppb or less, respectively. As a matter of course, the content of the metal contained in the organic alkali solution to be used can be less than 0.01 ppb, but it is difficult to obtain such an organic alkali solution.

Therefore, it can be easily obtained using an organic alkali solution in which the content of the metal satisfies the above range, and the metal impurities can be easily removed and reduced by the filtration step during and after the production of the reaction solution containing the halogen oxyacid. It is not clear why metal impurities can be removed or reduced by the filtration step. However, this is thought to be because the presence of a certain amount of metal impurities causes the formation of impurity particles of a certain size rather than colloidal particles that are difficult to remove by filtration, which can be removed by filtration. Accordingly, as solid metal impurities can be removed from and reduced in the organic alkali solution used in the present embodiment in the filtration step by lowering the pH, an organic alkali solution can be suitably used even in a case where it is not an ultra-high purity organic alkali solution. In order to further enhance this effect, and in particular, further remove and reduce impurities that are alkaline and ionized, the metal contents of sodium, potassium, aluminum, magnesium, iron, nickel, copper, silver, cadmium, and lead contained in the organic alkali solution are more preferably 0.01 ppb or more and 5 ppb or less, and more preferably 0.01 ppb or more 2 ppb or less, respectively.

As the organic alkali solution as described above, a commercially available one can be used. Above all, an organic alkali solution used as a photoresist developer of a semiconductor device, which has been purified by an electrolytic method and/or by contacting with an ion exchange resin or the like, can be preferably used. Then, these commercially available products can also be used by diluting them with a solvent that does not contain metal impurities such as ultrapure water.

In the producing method according to the embodiment of the present invention, the supply speed of the organic alkali solution used is preferably from 1 mL/min to 5 L/min, more preferably from 8.3 mL/min to 1 L/min, and still more preferably from 10 mL/min to 1 L/min when the volume of the reactor is 1 liter.

(Reaction Induced by Bringing Organic Alkali Solution into Contact with Halogen)

For example, in a case where quaternary alkylammonium hydroxide is used as an organic alkali, by contacting and reacting the solution thereof with a halogen, hydroxide ions of quaternary alkylammonium hydroxide are replaced with hypochlorite ions generated by the halogen such that a quaternary alkylammonium hypohalite solution is generated.

In the present embodiment, the halogen used is not particularly limited, and a commercially available halogen can be adopted. Specific examples of the halogen can include chlorine, bromine, hypochlorous acid, hypobromous acid, chlorous acid, bromous acid, chloric acid, and bromic acid. In a case where hypochlorous acid, hypobromous acid, chlorous acid, bromous acid, chloric acid, or bromic acid is used as the halogen, it can be a solution containing the halogen, a solution containing a salt of the halogen, or a solution containing ions of the halogen. In a case where chlorine or bromine is used as the halogen, a gas thereof, chlorine water, bromine water, or the like can be used. Of these, it is preferable to use chlorine gas.

As the halogen, a halogen having high purity, such as that used for etching a semiconductor material or as a starting material for a semiconductor material, can be used. In a case where chlorine gas or bromine gas is used as the halogen, among those with high purity, one having a particularly small water content is preferable, and specifically, one having a water content of 10 ppm by volume or less (based on mass) is preferably used. The reason for this is not clear, but the following can be considered. For example, in a case where chlorine gas is used for producing a quaternary alkylammonium hypochlorite solution, chlorine gas is usually transported via pipes. Therefore, in the presence of a large amount of water, hydrogen chloride is generated to corrode metal members such as pipes and flow meters, and it is considered that metal impurities corroded together with chlorine gas are easily introduced into the system. In view of this, it is preferable to use chlorine gas having a water content of 10 ppm by volume or less. As a matter of course, commercially available chlorine gas can be used as it is, or a desiccant or the like can be brought into contact with the chlorine gas immediately before being introduced into the reaction system, thereby reducing the amount of water contained in the chlorine gas. The lower limit of the amount of water contained in the chlorine gas is not particularly limited, but considering industrially available chlorine gas, it is 0.1 ppm by volume.

In a case where chlorine gas is used as a halogen in the present embodiment, the concentration of carbon dioxide contained in chlorine gas is not particularly limited, but is preferably 0.001 ppm by volume or more and 80 ppm by volume or less, more preferably 0.005 ppm by volume or more and 50 ppm by volume or less, and still more preferably 0.01 ppm by volume or more and 2 ppm by volume or less. When the concentration of carbon dioxide contained in the chlorine gas is in a range of 0.001 ppm by volume or more and 80 ppm by volume or less, the pH change of the obtained quaternary alkylammonium hypochlorite solution can be suppressed. As a result, the storage stability of the quaternary alkylammonium hypochlorite solution can be improved. Commercially available chlorine gas having such a carbon dioxide concentration can be used.

Next, a method of using a quaternary alkylammonium hydroxide solution as an organic alkali solution and chlorine gas as a halogen and bringing them into contact with each other in the present embodiment will be described as an example of the embodiment of the present invention. In the following description, it may be assumed that a quaternary alkylammonium hydroxide solution is used as the organic alkali solution, and chlorine gas is used as the halogen, unless otherwise specified, but the description is merely an example.

As shown in FIG. 1, a known method can be adopted as the method of supplying chlorine gas to be supplied into the reactor. It is preferable that the end of a chlorine gas supply means is located in the reactor, and the supplied chlorine gas is uniformly dispersed in the reactor. A pipe can be exemplified as the chlorine gas supply means, and it is preferable to arrange a disperser called "sparger" or the like at the end thereof such that the chlorine gas is diffused in the liquid phase in the reactor. There is no limitation on the sparger as long as it is generally used as a gas disperser. A sparger having a shape with a plurality of holes in a ring-shaped ring, a sparger having a shape with a plurality of holes formed in a branch-shaped pipe, and a sparger with a porous material applied at the tip, side, or the like of a pipe thereof for promoting uniform gas dispersion are preferable. Holes to be formed in the pipe can be appropriately determined in consideration of the gas ejection speed of chlorine gas, the liquid depth in the reactor, and the like.

Further, in order to avoid mixing carbon dioxide into the reaction system, it is preferable that the reaction in the production apparatus according to the embodiment of the present invention is carried out in a closed system. Simply, as shown in FIG. 1, the reaction can be sufficiently carried out by blowing chlorine gas into the quaternary alkylammonium hydroxide solution prepared in the reactor such that a quaternary alkylammonium hypochlorite solution having excellent storage stability can be produced.

In the present embodiment, the amount of halogen used (the number of moles of halogen used) is not particularly limited, and it can be appropriately determined in consideration of the concentration and total amount of the organic alkali to be used, the concentration and total amount of the halogen oxyacid obtained, and the like. For example, in a case where hypochlorous acid, hypobromous acid, chlorous acid, bromous acid, chloric acid, or bromic acid is used as the halogen, the amount of halogen used is preferably from 8 µmol to 3.4 mol per liter of the quaternary alkylammonium hydroxide solution. By using the halogen in this range, halogen oxyacid can be stably produced. The amount used can exceed 3.4 mol with respect to 1 liter of the quaternary alkylammonium hydroxide solution, but the pH of the obtained halogen oxyacid decreases, and the halogen oxyacid tends to be easily decomposed. On the other hand, when it is less than 8 µmol, the halogen oxyacid concentration is low, and the production efficiency deteriorates. Therefore, in consideration of industrial manufacturing, it is preferably from 8 µmol to 3.4 mol, more preferably from 80 µmol to 3.2 mol, and still more preferably from 800 µmol to 3.0 mol with respect to 1 liter of the quaternary alkylammonium hydroxide solution. However, the amount of halogen used can also be determined by the pH of the obtained solution, which means the pH of the obtained quaternary alkylammonium hypochlorite solution.

In addition, in the present embodiment, in a case where chlorine gas is used as the halogen, the amount of halogen used (total amount of chlorine gas used) is not particularly limited, but it is preferably from 0.1 to 37,000 mL in terms of 1 atm at 0° C. for 1 liter of the quaternary alkylammonium hydroxide solution. By using chlorine gas in this range, a drastic change in pH in the reaction system can be suppressed, and metal impurities can be easily removed and reduced by the filtration step. The amount of chlorine gas used can exceed 37,000 mL in terms of 1 atm at 0° C. for 1 liter of the quaternary alkylammonium hydroxide solution while the pH of the quaternary alkylammonium hydroxide solution tends to decrease and fluctuate significantly, and unreacted chlorine gas tends to remain. On the other hand, in a case where it is less than 0.1 mL, sufficient hypochlorite ions tend not to be generated. Therefore, in consideration of industrial manufacturing, the amount of chlorine gas used in terms of 1 atm at 0° C. is preferably in a range of from 0.1 to 37000 mL, more preferably in a range of from 1 to 35000 mL, and still more preferably in a range of from 10 to 31000 mL with respect to 1 liter of the quaternary alkylammonium hydroxide solution. However, the amount of chlorine gas used can also be determined by the pH of the obtained solution, namely, by the pH of the obtained quaternary alkylammonium hypochlorite solution.

Further, it is preferable to supply chlorine gas into the reactor at the following speed. The supply speed (rate) of chlorine gas in terms of 1 atm at 0° C. for 1 liter of the quaternary alkylammonium hydroxide solution is preferably 0.0034 Pa·m$^3$/sec or more and 63 Pa·m/sec or less (0.090 mmol/min or more and 1.7 mol/min or less) such that chlorine gas that does not cause a sharp drop in pH and is not involved in the reaction is reduced. By satisfying this range, the reactivity becomes sufficient, the pH does not drop or fluctuate rapidly, and a quaternary alkylammonium hypochlorite solution can be produced. To exert this effect more, the amount of chlorine gas supplied into the reaction system is more preferably 0.017 Pam/sec or more and 5.1 Pa·m$^3$/sec or less, and more preferably 0.034 Pa·m$^3$/sec or more and 1.7 Pa·m$^3$/sec or less.

In the present embodiment, the organic alkali can further contain a bromine salt. In an organic alkali containing a bromine salt, the halogen reacts with the organic alkali to produce, for example, hypohalous acid and a halide. Further, the hypohalous acid reacts with a bromide ion, hypobromous acid ion, bromous acid ion, bromic acid ion, or perbromic acid ion contained in the bromine salt, or with a bromine molecule generated from bromine salt, thereby yielding new halogen oxyacid. Here, the reaction between the hypohalous acid and the ion described above or the reaction between the hypohalous acid and the bromine molecule can be a reaction in which new halogen oxyacid is generated by adding a halogen to a solution containing a bromine salt and an organic alkali, which can be, for example, a redox reaction, disproportionation reaction, or radical reaction.

In the present invention, the bromine salt is a salt containing a bromine atom and is, for example, hypobromous acid salt, bromous acid salt, bromic acid salt, perbromic acid salt, and bromide. Examples of the bromide include hydrogen bromide, lithium bromide, sodium bromide, potassium bromide, rubidium bromide, cesium bromide, ammonium bromide, and onium bromide. The onium bromide described herein is a compound formed from an onium ion and a bromide ion. Here, the onium ion refers to, for example, a cation such as imidazole ion, pyrrolidinium ion, pyridinium ion, piperidinium ion, ammonium ion, phosphonium ion, fluoronium ion, chloronium ion, bromonium ion, iodonium ion, oxonium ion, sulfonium ion, selenonium ion, telluronium ion, arsonium ion, stibonium ion, or bismutonium ion. Further, a compound that produces hypobromous acid or hypobromous acid ions in a treatment solution can also be suitably used as a bromine-containing compound. Examples of such compounds include, but are not limited to, bromohydantoins, bromoisocyanuric acids, bromosulfamic acids, and bromochloramines. More specific examples of the compounds include 1-bromo-3-chloro-5,5-dimethylhydantoin, 1,3-dibromo-5,5-dimethylhydantoin, and tribromoisocyanuric acid.

To explain more specifically, the reaction of a bromine salt, an organic alkali, and a halogen in a case where the bromine salt is tetramethylammonium bromate, the organic alkali is tetramethylammonium hydroxide, and the halogen is chlorine can be illustrated as follows. When chlorine gas is blown into an aqueous solution containing tetramethylammonium bromide and tetramethylammonium hydroxide, tetramethylammonium hydroxide reacts with chlorine, thereby producing hypochlorous acid and a chloride. A part of the hypochlorous acid reacts with the bromide ion contained in tetramethylammonium bromide in the solution and directly oxidizes the bromide ion, thereby producing hypobromous acid. As a result, an aqueous solution containing hypochlorous acid, hypobromous acid, a chloride (tetramethylammonium chloride), unreacted tetramethylammonium bromide, and tetramethylammonium hydroxide can be obtained. That is, a halogen oxyacid containing two kinds of halogen oxyacids (hypochlorous acid and hypobromous acid) can be obtained. In addition, in a case where the number of moles of chlorine molecules is smaller than the number of moles of tetramethylammonium bromide in a solution containing a bromine salt and an organic alkali, an aqueous solution containing hypobromous acid, chloride (tetramethylammonium chloride), unreacted tetramethylammonium bromide, and tetramethylammonium hydroxide is obtained.

The concentration of the bromine salt that can be added to the organic alkali is not particularly limited, and for example, a range of 0.1 μmol/L to 10 mol/L can be exemplified. The solution containing a plurality of types of halogen acids thus obtained can be suitably used for semiconductor production.

(Gas Phase During Reaction)

The carbon dioxide concentration in the gas phase during the reaction is preferably 100 ppm by volume or less. In the present embodiment, the gas phase refers to a part occupied by gas in contact with a quaternary alkylammonium hydroxide solution during the reaction, which is, for example, the part occupied by the gas in the reactor (upper space) in the producing method shown in FIG. 1.

In the present embodiment, the upper limit of the carbon dioxide concentration in the gas phase is preferably 100 ppm by volume. In a case where the carbon dioxide concentration exceeds 100 ppm by volume, carbonate ions and bicarbonate ions are generated during the reaction due to the reactions of Formulas (1) and (2), and the pH of the quaternary alkylammonium hypochlorite solution is lowered accordingly.

$$CO_2 + OH^- \rightarrow HCO_3^- \tag{1}$$

$$HCO_3^- + OH^- \rightarrow CO_3^{2-} + H_2O \tag{2}$$

It is presumed that when the pH is lowered by the above chemical reactions, hypochlorous acid ions are decomposed during the storage of the obtained quaternary alkylammonium hypochlorite solution, and the storage stability deteriorates.

In the present embodiment, when the carbon dioxide concentration in the gas phase is from 0.001 to 100 ppm by volume, preferably from 0.01 to 80 ppm by volume, the pH of a quaternary alkylammonium hypochlorite solution can be sufficiently controlled such that a quaternary alkylammonium hypochlorite solution having excellent storage stability can be produced.

(pH in Liquid Phase During Reaction)

The pH of the liquid phase during the reaction of the present embodiment is preferably 10.5 or more. In the present embodiment, the liquid phase refers to a part occupied by a reaction solution produced by mixing a quaternary alkylammonium hydroxide solution and chlorine gas during the reaction. For example, it is the part occupied by the reaction solution in the reactor (lower space) in the manufacturing method shown in FIG. 1. The upper limit of the pH of the liquid phase is not particularly limited. However, when the pH during the reaction is excessively high, hypochlorous acid ions may be decomposed, and the effective chlorine concentration may decrease when stored at the same pH for a long period of time after the reaction is completed. Therefore, the pH of the liquid phase during the reaction is preferably 10.5 or more and 14.5 or less, more preferably 10.5 or more and 13.8 or less, and still more preferably 12.0 or more and 13.8 or less. When the pH is in the above range, the decomposition of hypochlorous acid ions is suppressed during the storage of the obtained quaternary alkylammonium hypochlorite solution, and thus storage stability is improved. Even in a case where the pH during the reaction is high, by controlling the pH during the storage within a specific range, as described later, storage stability is improved. Meanwhile, when the pH during the reaction is excessively low, storage stability will decrease due to the chemical reaction represented by Formula (3).

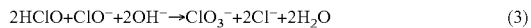
$$2HClO + ClO^- + 2OH^- \rightarrow ClO_3^- + 2Cl^- + 2H_2O \quad (3)$$

(Reaction Temperature)

The range of the reaction temperature in the producing method of the present embodiment is preferably −35° C. or higher and 45° C. or lower, more preferably −15° C. or higher and 40° C. or lower, and still more preferably −5° C. or higher and 35° C. or lower. When the reaction temperature is in the above range, a quaternary alkylammonium hydroxide solution and chlorine react sufficiently, and thus a quaternary alkylammonium hypochlorite solution can be obtained with high production efficiency. Meanwhile, in a case where the reaction temperature is less than −35° C., quaternary alkylammonium hydroxide solution begins to solidify, and the reaction with chlorine becomes insufficient. On the other hand, in a case where the reaction temperature exceeds 45° C., hypochlorous acid ions generated in a quaternary alkylammonium hydroxide solution are decomposed by heat. In particular, when the pH during the reaction is 13.8 or more, as the reaction temperature rises, the decomposition of hypochlorous acid ions becomes remarkable. The yield of quaternary alkylammonium hypochlorite can be evaluated based on the chlorine yield. As described above, according to the producing method of the present embodiment, it is possible to produce a quaternary alkylammonium hypochlorite solution having excellent storage stability, for example, which can sufficiently maintain the ability to perform cleaning and removal even after 10 days have passed since the production. As is apparent from this, the quaternary alkylammonium hypochlorite solution obtained by the producing method of the present embodiment has excellent storage stability and can be suitably used in the manufacturing steps of semiconductor devices.

(Material for Inner Surface of Reactor)

In the present embodiment, the quaternary alkylammonium hydroxide solution is brought into contact with the chlorine gas in the reactor, thereby producing a quaternary alkylammonium hypochlorite solution. At this time, first, a predetermined amount of the above quaternary alkylammonium hydroxide solution can be introduced into the reactor, and then chlorine gas can be introduced so as to come into contact with the quaternary alkylammonium hydroxide solution.

Then, in the present embodiment, the inner surface of the reactor that comes into contact with the quaternary alkylammonium hydroxide solution (hereinafter, sometimes simply referred to as the "inner surface of the reactor") is formed of general-purpose borosilicate glass or an organic polymer material. According to the study by the present inventors, when reactor made of general-purpose borosilicate glass (hereinafter referred to as "glass-made") is used as the reactor, the quaternary alkylammonium hydroxide solution used as a starting material slightly dissolves metal components contained in the glass-made reactor, for example, sodium, potassium, and aluminum. This is considered to be due to the fact that the quaternary alkylammonium hydroxide solution used as a starting material exhibits alkalinity. Therefore, more preferably, by forming the inner surface of the reactor with an organic polymer material, it is possible to further reduce the mixing of impurities (metal impurities) containing the metal.

Further, the reaction is preferably carried out in a light-shielded environment, and specifically, the reactor is preferably one in which the inside of the reactor is shielded from light. The chlorine gas existing in the reactor can be excited by light so as to generate chlorine radicals. In a case where chlorine radicals are generated, they may affect the quaternary alkylammonium hydroxide present in the reactor and the above-described quaternary alkylammonium hypochlorite generated by the reaction, resulting in decomposition. In addition, the quaternary alkylammonium hypochlorite itself may be decomposed by light, and thus the reactor, attached pipes, and the like are shielded from light in a preferable aspect.

In the present embodiment, when an organic solvent is used as the solvent, it is preferable that the reactor has an explosion-proof structure. Therefore, in order to have a simple apparatus configuration, it is preferable that the quaternary alkylammonium hydroxide solution uses water as a solvent.

In the present embodiment, vinyl chloride resin (soft/hard vinyl chloride resin), nylon resin, silicone resin, polyolefin resin (polyethylene, polypropylene), fluorine resin, or the like can be used as an organic polymer material used for the inner surface of the reactor. Among them, fluororesin is preferable in consideration of the ease of molding, solvent resistance, and less elution of impurities.

The fluororesin is not particularly limited as long as it is a resin (polymer) containing a fluorine atom, and a known fluororesin can be used. Examples thereof include polytetrafluoroethylene, polychlorotrifluoroethylene, polyvinylidene fluoride, tetrafluoroethylene-hexafluoropropylene copolymer, tetrafluoroethylene-perfluoroalkyl vinyl ether copolymer, tetrafluoroethylene-ethylene copolymer, chlorotrifluoroethylene-ethylene copolymer, and cyclic polymer of perfluoro (butenyl vinyl ether). Among them, it is preferable to use a tetrafluoroethylene-perfluoroalkyl vinyl ether copolymer in consideration of the availability of the reactor itself, productivity, and the like.

In the present embodiment, as a method of forming the inner surface of the reactor with an organic polymer material, a method of forming the entire reactor with an organic polymer material, a method of covering only the inner surface of a glass-made/stainless steel-made reactor with an organic polymer material, and the like can be mentioned.

The reactor can also be cleaned before use so as to prevent the elution of metal components from the organic polymer material. Specifically, it is preferable that the reactor is sufficiently washed with an acid such as high-purity nitric acid/hydrochloric acid (for example, washed by immersing it in a solution having an acid concentration of 1 mol/L for 12 hours) and further washed with ultrapure water or the like. Further, in order to carry out a stable reaction, it is preferable to wash the inner surface of the reactor formed of the organic polymer material by the above-described method before reacting the quaternary alkylammonium hydroxide solution with chlorine gas.

In the present embodiment, as long as the surface of the reactor with which the quaternary alkylammonium hydroxide solution comes into contact is formed of an organic polymer material, the other portions can be formed of glass, stainless steel, or immobilized stainless steel. However, since the effect is small, it is not essential, but it is preferable that a stirring rod and the like are also made of the same organic polymer material. In the present embodiment, the quaternary alkylammonium hydroxide solution can be brought into contact with chlorine gas in the reactor. It is, however, preferable to introduce chlorine gas into the quaternary alkylammonium hydroxide solution during stirring. The range of the reaction temperature at that time is not particularly limited, but is preferably the same as the above-described reaction temperature. Further, the presence of carbon dioxide in the reaction system tends to lower the pH of the obtained quaternary alkylammonium hypochlorite solution. Therefore, in consideration of stable production, it is preferable that the reaction system does not contain carbon dioxide. Specifically, it is preferable to use a quaternary alkylammonium hydroxide solution having a reduced amount of carbon dioxide, chlorine gas, or the like. Then, it is preferable to carry out the reaction in the presence of an inert gas in which the amount of carbon dioxide is reduced (for example, in the presence of nitrogen gas). As a result of the reaction under such conditions, the pH decrease of the obtained quaternary alkylammonium hypochlorite solution can be suppressed such that the storage stability is improved.

<Filtration Step>

In the producing method according to the present embodiment, when the quaternary alkylammonium hydroxide solution and chlorine gas come into contact with each other so as to form a quaternary alkylammonium hypochlorite solution, the pH of the solution in the reaction system decreases. At that time, a solid containing metal impurities may precipitate, and in order to remove/reduce it, it is preferable to further include a step of filtering in a preferred embodiment. That is, it is preferable to filter the quaternary alkylammonium hypochlorite solution obtained during the above reaction or by supplying chlorine gas to a predetermined concentration. The filtration step can be performed after the storage step or the dilution step described later. In the filtration step, a metal component to be filtered out may differ depending on the pH of the quaternary alkylammonium hypochlorite solution.

Specifically, in a case where the pH of quaternary alkylammonium hypochlorite solution is set to 13.5 or less, preferably in a case where the pH of the solution is more than 12.5 and 13.5 or less, as hydroxides such as magnesium, iron, and cadmium, and oxides of nickel and silver solidify, these impurities can also be removed and reduced by performing a filtration step. In a case where the pH of the quaternary alkylammonium hypochlorite solution is 12.5 or less, preferably in a case where the pH of the solution is 9.0 or more and 12.5 or less, the oxides of copper and lead are solidified in addition to the above impurities. These impurities can also be removed and reduced by performing the filtration step. The pH of the solution may fluctuate depending on the temperature. The above pH is a value at 25° C. as a reference value. The liquid temperature at which the filtration step is actually carried out is not limited to 25° C., but is preferably from 0 to 60° C. and more preferably from 10° C. to 50° C. The solid of such metal impurities is also produced by increasing the purity of the quaternary alkylammonium hydroxide solution as a starting material and chlorine gas. In particular, the solid may also be produced in a case where the inner surface of the reactor is formed of an organic polymer material. The cause of this is unclear, but it is presumed that metal impurities are contained in the reaction system from somewhere in the reactor because chlorine gas, which is a highly corrosive gas, is used.

The filtration step can be carried out at a pH at which metals to be removed or reduced are solidified. Therefore, the step can be carried out only once, or can be carried out a plurality of times at each pH. At that time, the filtration efficiency is further improved by preparing a plurality of filtration filters having different pore sizes at each pH and performing filtration in order from the filtration filter having the largest pore size. Specifically, it can be carried out by removing the coarse particles in the first stage and the fine particles in the second stage. Of the solids such as mere metal impurities, metal oxides, metal hydroxides and/or colloidal substances containing a metal component, particles having particle sizes of 1 μm or more and 100 μm or less may be simply referred to as "coarse particles." On the other hand, particles having particle sizes of 0.01 μm or more and less than 1 μm are hereinafter simply referred to as "fine particles." The particle size of a solid refers to the equivalent circle diameter determined by laser diffraction.

The above-described filtration step is not particularly limited, and can be carried out by using a known filtration device or filtration filter. However, in order not to increase unnecessary metal components, it is preferable that the surface with which the quaternary alkylammonium hypochlorite solution may come into contact is formed of an organic polymer material in the filtration device. Those exemplified above can be used as the organic polymer.

As a specific filtration filter, it is preferable to use a filtration filter made of an organic polymer material or an inorganic material. Examples thereof include polyolefin (polypropylene, polyethylene, ultra-high-molecular-weight polyethylene), polysulfone, cellulose acetate, polyimide, polystyrene, fluorine resin (described above), and/or quartz fiber filtration filters. Further, it is preferable to use a filtration filter in which a positively charged membrane and a negatively charged membrane are combined. The reason for this is that many metal oxides and metal hydroxides are negatively charged in an alkaline atmosphere, and therefore, it is possible to effectively remove metal components with a filtration filter that is positively charged by electrostatic adsorption. In addition, some metal components exist in the state of cations and are positively charged. Therefore, a negatively charged filtration filter can effectively remove the ionized metal component by electrostatic adsorption. Further, a filter having an ion exchange ability and a chelate forming ability, for example, a filter containing an ion exchange resin or a chelate exchange resin, can also be used. A plurality of these filters can be used in combination.

The pore size of a filtration filter is not particularly limited, but a filtration filter having a pore size of 1 μm or more or a microfiltration filter can be used for removing coarse particles. Meanwhile, a microfiltration filter having a pore size of 0.01 μm or more and less than 1 μm, an ultrafiltration filter, or a nanofiltration membrane can be used to remove the fine particles. As the filtration filter as described above, a commercially available one can be used. Specifically, polytetrafluoroethylene—"Fluorogard (registered trademark) ATX filter (pore size: 0.05 μm)," "QuickChange (registered trademark) ATE filter (pore size: 0.03 μm)," "Torrento (registered trademark) ATE filter (pore size: 0.02 μm)," "QuickChange (registered trademark) ATE filter (pore size: 0.03 μm)," "Fluoroline (registered trademark) P-150 (pore size: 0.05 μm, 0.1 μm)" manufactured by Nihon Entegris G.K. can be used.

The above filtration step can be performed before adjusting the pH of the quaternary alkylammonium hypochlorite solution to a range suitable for the application. In this case, after performing the filtration step once, the quaternary alkylammonium hypochlorite solution is mixed with chlorine gas again such that a quaternary alkylammonium hypochlorite solution having a desired pH can be prepared. It is also possible to prepare a quaternary alkylammonium hypochlorite solution having a desired pH by mixing the quaternary alkylammonium hypochlorite solution with water, an acid such as hydrogen chloride, and/or an alkali such as an aqueous solution of quaternary tetramethylammonium hydroxide. Meanwhile, in a case where the pH of the produced quaternary alkylammonium hypochlorite solution is suitable as a cleaning liquid, the solution can be filtered and used as it is as a cleaning liquid used when manufacturing a semiconductor device.

By performing such a filtration step, in particular, metal components such as magnesium, iron, nickel, copper, silver, cadmium, and lead can be reduced.

<Storage Step>

A reaction solution (a quaternary alkylammonium hypochlorite solution will be exemplified for explanation below) containing halogen oxyacid obtained after the producing method according to the present embodiment, or by carrying out the above-described producing method further including the filtration step can be directly used for the predetermined use for a cleaning liquid or the like, but it is generally used after the storage step (including storage and transportation). A quaternary alkylammonium hypochlorite solution alone had poor storage stability, and it was necessary to add a stabilizer. However, the stabilizer may cause organic residue, and improvement has been sought. On the other hand, by further carrying out the storage step described below, it becomes possible to supply a quaternary alkylammonium hypochlorite solution having further improved storage stability.

The method of producing a quaternary alkylammonium hypochlorite solution in one embodiment of the present invention preferably comprises a storage step of storing the reaction solution after the above-described steps, and it is preferable to adjust the pH of the quaternary alkylammonium hypochlorite solution at 25° C. to 12.0 or more and less than 14.0 in the storage step. In a case where a filtration step is included after the above-described producing method of the present embodiment, a storage step can be included after the filtration step.

The concentration of the quaternary alkylammonium hypochlorite solution to be stored is not particularly limited. However, in consideration of industrial manufacturing, a quaternary alkylammonium hypochlorite solution containing 0.001% to 20% by mass of hypochlorite ions and 0.001% to 50% by mass of quaternary alkylammonium ions at a predetermined pH is preferable. The "predetermined pH" means any pH of 12.0 or more and less than 14.0 selected as the pH in the storage step.

In addition, various additives can be optionally added to the quaternary alkylammonium hypochlorite solution depending on the intended use. For example, as an additive, a metal chelating agent, a complexing agent, a metal dissolution accelerator, a metal corrosion inhibitor, a surfactant, an acid, an alkali, and the like can be added. With the addition of these additives, it can be expected that metal dissolution is promoted or suppressed during semiconductor wafer processing, surface roughness is improved, processing speed is improved, and particle adhesion is reduced. Therefore, the cleaning liquid containing these additives can be suitably used for processing semiconductor wafers. The storage step of a quaternary alkylammonium hypochlorite solution according to a preferable embodiment is to store a quaternary alkylammonium hypochlorite solution in a limited pH range. The storage step will be described in detail below.

Here, "storage" means from the start of storage of the quaternary alkylammonium hypochlorite solution in a state where the pH at 25° C. is 12.0 or more and 14.0 or less until the concentration and/or pH of the quaternary alkylammonium hypochlorite solution is adjusted. In a case where the pH of the solution after adjusting the pH is 12.0 or more and 14.0 or less, when the solution is further stored, it also corresponds to the storage step of the present embodiment. When the pH of the quaternary alkylammonium hypochlorite solution is 12.0 or more and 14.0 or less from the beginning, it can be stored as it is. When the pH of the solution is less than 12.0 or more than 14.0, the pH can be adjusted to 12.0 or more and 14.0 or less before storage.

The pH of the solution may fluctuate depending on the temperature. The above pH is a value at 25° C. as a reference value. The liquid temperature at the time of actually storing the solution is not limited to 25° C. Therefore, the storage conditions are not particularly limited, but it is preferable to store the solution under general storage conditions, which means to store it in a known container, a canister can, or a resin-made storage container at from −25° C. to 50° C., and it is more preferable to store the solution in a storage container that can block light, a transport container such as a canister can, or a resin-made storage container filled with inert gas at from −20° C. to 40° C. in a dark place. In a case where the storage temperature exceeds the above range, hypochlorite ions may form oxygen molecules by thermal decomposition during long-term storage, causing the container to expand and break.

In a preferable embodiment, the solution is stored as a quaternary alkylammonium hypochlorite solution having a pH of 12.0 and more and 14.0 or less at 25° C. Within this pH range, the hypochlorite ion concentration does not decrease, and long-term storage is possible. When the pH is less than 12.0, the disproportionation reaction of hypochlorite ions proceeds, the hypochlorite ions are decomposed, and the oxidizing power of the quaternary alkylammonium hypochlorite solution decreases. On the other hand, when the pH exceeds 14.0, it is presumed that organic ions, which are cations, are decomposed. As a result, it is presumed that the disproportionation reaction of hypochlorite ions, which was inhibited by the bulkiness of organic ions, proceeds again, and hypochlorite ions are decomposed. The solution is stored as a quaternary alkylammonium hypochlorite solution having a pH of 12.0 or more and 14.0 or less at 25° C.

The reason why the storage stability is improved by the above storage method is not clear, but the present inventors presume as follows. It is presumed that quaternary alkylammonium hypochlorite is partially dissociated into hypochlorite ions and organic ions in a quaternary alkylammonium hypochlorite solution, but most hypochlorite ions and organic ions are ionically bonded, and thus, the three-dimensional bulkiness of organic ions suppresses the disproportionation reaction of hypochlorite ions. Therefore, it is considered that the larger the three-dimensional bulkiness of the organic ion, the more the disproportionation reaction is suppressed, and the storage stability is improved. As long as the organic ion is a bulky quaternary alkylammonium ion, for example, tetramethylammonium ion, the disproportionation reaction can be sufficiently suppressed. After the storage step according to the present embodiment, the oxidizing power of the quaternary alkylammonium hypochlorite solution during storage hardly changes even in a case where the storage period is 30 days, preferably 60 days, or still more preferably 90 days. Therefore, after storage, it can be used for various purposes only by diluting the quaternary alkylammonium hypochlorite solution according to the conditions of use. The longer the storage period, the more the effect of improving productivity can be expected. A diluted solution (cleaning liquid) having a high hypochlorite ion concentration can be obtained by carrying out the dilution step after the storage in the storage step.

<Apparatus of Producing Solution Containing Halogen Oxyacid>

Next, an embodiment of a production apparatus for producing halogen oxyacid will be described. The producing method described above can be carried out using the production apparatus of the present embodiment. As an example of the production apparatus of the present embodiment, a case where a quaternary ammonium hydroxide solution is used as an organic alkali, and chlorine gas is used as a halogen will be exemplified. As the conditions such as the type and concentration of the organic alkali and halogen supplied as starting materials, the conditions described in the above-described method of producing halogen oxyacid can be used as they are.

FIG. 1 shows a schematic view of the production apparatus according to the present embodiment. The production apparatus illustrated in FIG. 1 includes: a reactor 1; a quaternary ammonium hydroxide solution supply pipe 2 as a means of supplying an organic alkali supply means to the reactor; a chlorine gas supply pipe 3 as a means of supplying a halogen to the reactor; and a reaction solution collection pipe 10 as a reaction solution collection means for taking out a reaction solution from the reactor.

In the reactor 1, the quaternary ammonium hydroxide solution to be supplied is supplied from the quaternary ammonium hydroxide solution supply pipe 2, chlorine gas to be supplied is supplied from the chlorine gas supply pipe 3, each of which is continuously supplied. Further, the generated reaction solution is continuously collected from the reaction solution collection pipe 10.

As for the inner surfaces of the reactor 1, the quaternary ammonium hydroxide solution supply pipe 2, and the reaction solution collection pipe 10, the conditions described in the producing method described above can be used as they are. The inner surfaces of the reactor 1, the quaternary ammonium hydroxide solution supply pipe 2, and the reaction solution collection pipe 10 are preferably made of an organic polymer material.

Regarding the supply speed of each of the quaternary ammonium hydroxide solution and chlorine gas to be supplied, the same conditions as those of the producing method described above can be used. Specifically, the supply speed in terms of 1 atm at 0° C. for 1 liter of the quaternary alkylammonium hydroxide solution is preferably 0.0.34 Pa·m$^3$/sec or more and 16.9 Pa·m$^3$/sec or less.

Further, the chlorine gas supply means can be provided with a sparger for facilitating the dispersion of chlorine gas in the liquid phase. Specifically, an aspect in which a sparger (not shown) is installed at the tip of the chlorine gas supply pipe 3 on the reactor side can be exemplified. For example, a sparger that can be adopted is one in which a ring-shaped ring is provided at the tip of the chlorine gas supply pipe 3, and a plurality of holes are formed in the ring such that chlorine gas is blown out from the holes to disperse chlorine gas in the reactor. The shape of the sparger is preferably such that the dispersion of chlorine gas in the reactor is as uniform as possible. The blowing speed of chlorine gas from holes is preferably 0.1 m/sec or more and 10 m/sec or less in terms of 1 atm at 0° C.

As the volume of the reactor 1, a volume of from 0.1 to 120 min as the liquid residence time of the supplied quaternary ammonium hydroxide solution is a preferable aspect. The liquid residence time is more preferably from 0.1 to 100 min.

The reactor 1 can be provided with a means of supplying nitrogen into the reactor 1 in order to adjust the concentration of the gas component in the gas phase in the reactor 1. As the means of supplying nitrogen, a configuration including a pump of supplying nitrogen from the outside to the inside of the reactor 1 and a pipe through which nitrogen flows can be exemplified.

The reaction between quaternary ammonium hydroxide and chlorine is an exothermic reaction. In the production apparatus according to the present embodiment, the temperature inside the reactor 1 can be measured by using, for example, an in-reactor temperature meter 4 as a temperature measuring means in the reactor 1. Further, the production apparatus according to the present embodiment can include a reactor temperature control jacket 5 as a means of controlling the reaction temperature in the reactor, specifically, as a means of removing heat from the reactor. Heat can be removed by the reactor temperature control jacket 5.

Further, the production apparatus according to the present embodiment can include an in-reactor pH meter 6 (pH1 in FIG. 1) arranged in the reactor 1 as a means of measuring the pH of the reaction solution in the reactor. The pH of the reaction solution in the reactor can be measured by the pH meter 6 in the reactor. The production apparatus according to the present embodiment preferably includes at least one of the reaction temperature measuring means, the reaction temperature controlling means, and the pH measuring means in the reactor, more preferably two of them, and still more preferably all of them.

In the production apparatus according to the present embodiment, stirring of the reaction solution in the reactor 1 can be performed by a reaction solution circulation means. Specifically, the production apparatus according to the present embodiment can further include: a collection pipe for reaction solution circulation 7 as a reaction solution circulation means; a reaction solution circulation pump 8 for collecting and feeding a reaction solution; and a reaction solution discharge pipe 9 for feeding a reaction solution into the reactor, in addition to the pipe 10 as the reaction solution collection means. In that aspect, the reaction solution is collected by the pump 8 through the collection pipe 7, and the reaction solution is discharged to the reactor 1 through the reaction solution discharge pipe 9 so as to be recycled. The circulation volume of the reaction solution is not particularly limited, but it is preferable to set the solution such that the solution in the reactor becomes uniform.

As for the inner surfaces of the collection pipe for reaction solution circulation 7 and the reaction solution discharge pipe 9, the conditions described in the producing method described above can be used as they are. It is preferable that the inner surfaces of the collection pipe for reaction solution circulation 7 and the reaction solution discharge pipe 9 are made of an organic polymer material. As the pump 8, a chemical diaphragm pump, a tube pump, a magnet pump, or the like can be used. Among them, in order to prevent contamination by metal components, it is preferable to use a pump that has a wetted part made of the above-described fluororesin, and, in consideration of availability, it is preferable to use a magnet pump.

The production apparatus according to the present embodiment can further include an overflow pipe in the pipe 10 which is the reaction solution collection means, for feeding a reaction solution to a different site such that the level of the reaction solution in the reactor becomes constant in a case where the liquid level has risen above a certain level. For example, a certain amount of the reaction solution can be collected through the reaction solution overflow pipe 11 installed in the pipe 10. The production apparatus according to the present embodiment can include a liquid level confirmation device (not shown) for confirming the height of the reaction solution in the reactor and adjusting the flow rate of the reaction solution to overflow. Further, the production apparatus according to the present embodiment can further include a weight measuring device for measuring the weight of the reactor 1. In that aspect, the reactor 1 is placed on the weight measuring device to adjust the amount of the reaction solution collected such that the weight of the reaction solution in the reactor becomes constant, thereby making it possible to keep the height of the reaction solution in the reactor constant.

In addition, in the production apparatus according to the present embodiment, a pH meter 12 (pH2 in FIG. 1) can be installed as a pH measuring means for the collected reaction solution in the pipe 10, which is the reaction solution collection means. The pH of the collected reaction solution can be measured by the pH meter 12.

The reaction solution collection pipe 10 can be provided with abatement means such that unreacted chlorine or the like is not discharged to the outside of the system, and specifically, a caustic soda abatement device 13 can be provided. As the configuration of the caustic soda abatement device 13, for example, a configuration in which a gas contained in the reaction solution fed through the reaction solution collection pipe 10 is submerged in a solution containing caustic soda can be employed.

Similarly, with respect to the exhaust gas generated from the reactor, the reactor 1 can have an abatement means such that the unreacted chlorine gas is not discharged to the outside of the system of the production apparatus. The abatement means can be composed of an exhaust gas pipe 14 extending from the reactor and a caustic soda abatement device for reactor exhaust gas 15 connected to the exhaust gas pipe 14. As the configuration of the caustic soda abatement device 15, a configuration in which the exhaust gas discharged from the reactor 1 through the exhaust gas pipe 14 is submerged in a solution containing caustic soda can be employed.

The reaction liquid collected through the reaction solution collection pipe 10 can be fed to a product adjustment device (not shown). In the product adjustment device, the concentration and pH of the reaction solution fed from the reactor are adjusted. One or more of an organic alkali solution such as a quaternary ammonium hydroxide solution, hydrochloric acid, or water is optionally supplied to the product adjustment device, thereby adjusting the component concentration and pH of the reaction solution. As a configuration of the product adjustment device, a tank having a sufficient volume to supply one or more of the quaternary ammonium hydroxide solution, hydrochloric acid, and water in addition to the reaction solution can be exemplified.

As for the inner surface of the product adjustment device, the conditions described in the producing method described above can be used as they are. It is preferable that the inner surface of the product adjustment device is made of an organic polymer material.

In addition, the product adjustment device can be provided with a means of supplying nitrogen into the product adjustment device in order to adjust the concentration of the gas component in the gas phase in the product adjustment device. As the means of supplying nitrogen, a configuration including a pump of supplying nitrogen from the outside to the inside of the product adjustment device and a pipe through which nitrogen flows can be exemplified.

Further, the production apparatus according to the present embodiment can be provided with a filtration device upstream and/or downstream of the product adjustment device described above. As the filtration device, a configuration including a reaction solution transfer pipe, a pump, a filtration filter, and a reaction solution return pipe can be exemplified. Since each member in such a filtration device comes into contact with the reaction solution containing quaternary alkylammonium hypochlorite, the member is preferably formed of the above-described organic polymer material. Further, as the filtration filter, the one exemplified in the filtration step can be used.

The production apparatus according to the present embodiment can further include an organic alkali solution adjustment device for adjusting an organic alkali solution supplied to the reactor or product adjustment device described above. An organic alkali and water, which are starting materials, are supplied to the organic alkali solution adjustment device. The concentration and pH of the organic alkali solution are adjusted in the organic alkali solution adjustment device. As a configuration of the organic alkali solution adjustment device, a tank provided with a pipe for supplying an organic alkali, a pipe for supplying water, and a collection pipe for collecting the adjusted organic alkali solution can be exemplified. The organic alkali solution collected from the collection pipe is supplied to the reactor and/or the product adjustment device through the pipe through which the organic alkali solution flows. In addition, the organic alkali adjustment device can be provided with a circulating temperature control means for controlling the temperature of the solution in the adjustment device. As a configuration of the circulating temperature control means, a configuration in which a pipe through which a part of the organic alkali solution collected from the collection pipe flows, a heat exchanger for heat exchange of the organic alkali solution supplied from the pipe, a pipe for returning the temperature-controlled organic alkali solution through the heat exchanger to the organic alkali solution adjustment device, and a pump for circulating the organic alkali solution are provided can be exemplified.

The organic alkali solution adjustment device can be provided with a means of supplying nitrogen into the product adjustment device in order to adjust the concentration of the gas component in the gas phase in the product adjustment device. As the means of supplying nitrogen, a configuration including a pump of supplying nitrogen from the outside to the inside of the product adjustment device and a pipe through which nitrogen flows can be exemplified.

EXAMPLES

Next, the present invention will be described in detail with reference to Examples and Comparative Examples below, but the present invention is not limited to Examples.

<Method of Measuring pH>

The pH of 30 mL of each of a quaternary alkylammonium hydroxide solution and a quaternary alkylammonium hypochlorite solution was measured using a desktop pH meter (LAQUA F-73 manufactured by HORIBA, Ltd.). The pH was measured after stabilization at 25° C.

<Method of Calculating Effective Chlorine Concentration and Hypochlorite Ion Concentration>

To a 100 mL Erlenmeyer flask, 0.5 mL of a treatment solution (quaternary ammonium hypochlorite solution), 2 g of potassium iodide (special grade reagent manufactured by FUJIFILM Wako Pure Chemical Corporation), 8 mL of 10% by mass acetic acid, and 10 mL of ultrapure water were added, and the mixture was stirred until the solid dissolved, thereby obtaining a brown solution.

The prepared brown solution was subjected to redox titration using a 0.02 M sodium thiosulfate solution (manufactured by FUJIFILM Wako Pure Chemical Corporation for volumetric analysis) until the color of the solution changed from brown to very pale yellow, and then a starch solution was added, thereby obtaining a lilac solution.

A 0.02 M sodium thiosulfate solution was continuously added to this solution, and the effective chlorine concentration was calculated with the point at which it became colorless and transparent as the endpoint. In addition, the hypochlorite ion concentration was calculated from the obtained effective chlorine concentration. For example, in a case where the effective chlorine concentration is 1% by mass, the hypochlorite ion concentration is 0.73% by mass.

<Method of Calculating Carbon Dioxide Concentration in Gas Phase>

The carbon dioxide concentration in the gas phase in the reaction solution was measured using a $CO_2$ monitor ($CO_2$-M1 manufactured by CUSTOM corporation).

<Chlorine Yield>

The chlorine yield was determined from the ratio (%) of the number of moles of generated hypochlorite ions to the number of moles of supplied chlorine molecules. In a case where all the added chlorine has reacted (no decomposition has occurred), the chlorine yield is 100%. In a case where hypochlorite ions are decomposed during the reaction, the chlorine yield decreases.

<Method of Evaluating Storage Stability>

The quaternary alkylammonium hypochlorite solution was transferred into a glove bag. After the carbon dioxide concentration in the glove bag became 1 ppm or less, the solution was transferred to a container made of PFA (perfluoroalkoxy fluororesin:tetrafluoroethylene-perfluoroalkyl vinyl ether copolymer) and sealed. Next, after storing for 10 days in a light-shielded environment at 23° C., the hypochlorite ion concentration of the quaternary alkylammonium hypochlorite solution in the PFA container was measured. The hypochlorite ion concentration ratio (concentration after 10 days/initial concentration) was determined to be favorable when it was from 60% to 100% or was determined to be poor when it was less than 60%.

Example 1

A cylindrical reactor (made of PTFE) having a diameter of 130 mm was charged with 500 mL of a tetramethylammonium hydroxide solution (8.6% by mass, pH 14.0). The liquid in the reactor was circulated at 500 mL/min with a circulation pump attached to the reactor, during which the tetramethylammonium hydroxide solution (8.6% by mass, pH 14.0) and a chlorine gas were supplied to the reactor at 41 mL/min and 17.7 mmol/min, respectively. The generated tetramethylammonium hypochlorite solution was retrieved from a liquid collecting outlet installed at a height of 38 mm from the bottom of the reactor. The liquid residence time in the reactor was 12 min, and the reaction temperature was 25° C.

The tetramethylammonium hypochlorite solution generated at the outlet of the reactor became stable after 30 min and reacted for 226 min after stabilization. The amount of liquid obtained per unit time was 0.041×226/256=0.0036-0.036 L/min. The effective chlorine concentration was 3.1% by mass, the pH was 12.9, and the chlorine yield was 99% or more. The storage stability was favorable. The pH in the reactor was from 12.9 to 13.2.

Example 2

A cylindrical reactor (made of PTFE) having a diameter of 130 mm was charged with 1500 mL of a tetramethylammonium hydroxide solution (8.6% by mass, pH 14.0). The liquid in the reactor was circulated at 1500 mL/min with a circulation pump attached to the reactor, during which the tetramethylammonium hydroxide solution (8.6% by mass, pH 14.0) and a chlorine gas were supplied to the reactor at 82 mL/min and 35.3 mmol/min, respectively. The generated tetramethylammonium hypochlorite solution was retrieved from a liquid withdrawing outlet installed at a height of 113 mm from the bottom of the reactor. The liquid residence time in the reactor was 18 min, and the reaction temperature was 25° C.

The tetramethylammonium hypochlorite solution generated at the outlet of the reactor became stable after 30 min and reacted for 226 min after stabilization. The amount of liquid obtained per unit time was 0.082×226/256=0.072 L/min. The effective chlorine concentration was 3.1% by mass, the pH was 12.9, and the chlorine yield was 99% or more. The storage stability was favorable. The pH in the reactor was from 12.9 to 13.2.

Example 3

Example 3 was carried out in the same manner as in Example 2 except that the tetramethylammonium hydroxide solution (8.6% by mass, pH 14.0) and chlorine were supplied to the reactor at 164 mL/min and 70.7 mmol/min, respectively. The liquid residence time in the reactor was 9 min, and the reaction temperature was 25° C.

The tetramethylammonium hypochlorite solution generated at the outlet of the reactor became stable after 30 min and reacted for 226 min after stabilization. The amount of liquid obtained per unit time was 0.164×226/256=0.145 L/min. The effective chlorine concentration was 3.1% by mass, the pH was 12.9, and the chlorine yield was 99% or more. The storage stability was favorable. The pH in the reactor was from 12.9 to 13.2.

Example 4

Example 4 was carried out in the same manner as in Example 2 except that the tetramethylammonium hydroxide solution (8.6% by mass. pH 14.0) and chlorine were supplied to the reactor at 246 mL/min and 106 mmol/min, respectively. The liquid residence time in the reactor was 6 min, and the reaction temperature was 25° C.

The tetramethylammonium hypochlorite solution generated at the outlet of the reactor became stable after 30 min and reacted for 226 min after stabilization. The amount of liquid obtained per unit time was 0.246×226/256=0.217 L/min. The effective chlorine concentration was 3.1% by mass, the pH was 12.9, and the chlorine yield was 99% or more. The storage stability was favorable. The pH in the reactor was from 12.9 to 13.2.

Regarding the reaction conditions, the reaction conditions are listed in Table 1, and the results and the like are organized in Table 2.

Comparative Example

As a Comparative Example, an experimental example when using a batch reaction is shown below.

A cylindrical reactor having a diameter of 190 mm was charged with 10,000 mL of a tetramethylammonium hydroxide solution (8.6% by mass, pH 14.0). The liquid in the reactor was circulated at 500 mL/min with a circulation pump attached to the reactor, during which chlorine was supplied at 17.7 mmol/min. The generated tetramethylammonium hypochlorite solution was collected when the liquid residence time in the reactor was 256 min. The amount of liquid obtained per unit time was 10/256=0.039 L/min. The reaction temperature was 25° C.

For the generated quaternary tetramethylammonium hypochlorite solution, the effective chlorine concentration was 2.9% by mass, the pH was 12.9, and the chlorine yield was 91%. The storage stability was poor.

Example 5

A cylindrical reactor (made of PTFE) having a diameter of 130 mm was charged with 500 mL of a tetramethylammonium hydroxide solution (0.003% by mass, pH 10.5). The liquid in the reactor was circulated at 500 mL/min with a circulation pump attached to the reactor, during which the tetramethylammonium hydroxide solution (0.003% by mass, pH 10.5) and a chlorine gas were supplied to the reactor at 500 mL/min and 0.08 mmol/min, respectively. The generated tetramethylammonium hypochlorite solution was retrieved from a liquid collecting outlet installed at a height of 38 mm from the bottom of the reactor. The liquid residence time in the reactor was 1 min, and the reaction temperature was 25° C.

The tetramethylammonium hypochlorite solution generated at the outlet of the reactor became stable after 30 min and reacted for 226 min after stabilization. The amount of liquid obtained per unit time was 0.500×226/256=0.441 L/min. The effective chlorine concentration was 0.001% by mass, the pH was 9.0, and the chlorine yield was 99% or more. The obtained solution was then adjusted to pH 12.0 by adding a tetramethylammonium hydroxide solution. The storage stability was favorable.

Example 6

A cylindrical reactor (made of PTFE) having a diameter of 130 mm was charged with 500 mL of a tetramethylammonium hydroxide solution (25% by mass, pH 14.4). The liquid in the reactor was circulated at 500 mL/min with a circulation pump attached to the reactor, during which the tetramethylammonium hydroxide solution (25% by mass, pH 14.4) and a chlorine gas were supplied to the reactor at 51 mL/min and 69.8 mmol/min, respectively. The generated tetramethylammonium hypochlorite solution was retrieved from a liquid collecting outlet installed at a height of 38 mm from the bottom of the reactor. The liquid residence time in the reactor was 10 min, and the reaction temperature was 25° C.

The tetramethylammonium hypochlorite solution generated at the outlet of the reactor became stable after 30 min and reacted for 226 min after stabilization. The amount of liquid obtained per unit time was 0.500226/256=0.441 L/min. The effective chlorine concentration was 8.8% by mass, the pH was 12.0, and the chlorine yield was 99% or more. The storage stability was favorable.

TABLE 1

| | Reactor Volume [L] | TMAH [% by mass] | TMAH Supply [mL/min] | Chlorine [mmol/min] | Liquid Residence [min] | Reaction [° C.] |
|---|---|---|---|---|---|---|
| Example 1 | 0.5 | 8.6 | 41 | 17.7 | 12 | 25 |
| Example 2 | 1.5 | 8.6 | 82 | 35.3 | 18 | 25 |
| Example 3 | 1.5 | 8.6 | 164 | 70.7 | 9 | 25 |
| Example 4 | 1.5 | 8.6 | 246 | 106 | 6 | 25 |
| Example 5 | 0.5 | 0.003 | 500 | 0.08 | 1 | 25 |
| Example 6 | 0.5 | 0.003 | 500 | 0.08 | 1 | 25 |
| Comparative Example | 10 | 8.6 | — | 17.7 | 256 | 25 |

TABLE 2

| | Effective Chlorine Concentration [% by mass] | Chlorine Yield [%] | Storage Stability | Reaction Time After Stabilization [min] | Liquid Volume Obtained Per Unit Time [L/min] |
|---|---|---|---|---|---|
| Example 1 | 3.1 | >99 | Favorable | 226 | 0.036 |
| Example 2 | 3.1 | >99 | Favorable | 226 | 0.072 |
| Example 3 | 3.1 | >99 | Favorable | 226 | 0.145 |
| Example 4 | 3.1 | >99 | Favorable | 226 | 0.217 |
| Example 5 | 0.01 | >99 | Favorable | 226 | 0.441 |
| Example 6 | 0.01 | >99 | Favorable | 226 | 0.441 |
| Comparative Example | 2.9 | 91 | Poor | 256 | 0.039 |

REFERENCE SIGNS LIST

1 Reactor
2 Quaternary alkylammonium hydroxide solution supply pipe
3 Chlorine gas supply pipe
4 In-reactor temperature meter
5 Reactor temperature control jacket
6 In-reactor pH meter (pH1)
7 Collection pipe for reaction solution circulation
8 Reaction solution circulation pump
9 Reaction solution discharge pipe 10 Reactor collection pipe
11 Reaction solution overflow pipe
12 pH meter for collected reaction solution (pH2)
13 Caustic soda abatement device
14 Exhaust gas pipe
15 Caustic soda abatement device for reactor exhaust gas

The invention claimed is:

1. A method for producing halogen oxyacid, which comprises a step of continuously supplying and mixing an organic alkali solution and a halogen into a reactor, and continuously collecting a reaction solution containing the halogen oxyacid generated,
    wherein a residence time of the reaction solution is from 0.1 to 120 minutes,
    the reaction solution is continuously collected after a pHI of the reaction solution in the reactor becomes constant,
    the pH of the reaction solution in the reactor is from 10.5 to 14.5, and
    an amount of the reaction solution in the reactor is kept constant.

2. The producing method according to claim 1, wherein an amount of the reaction solution which is continuously collected corresponds to an amount of the organic alkali solution and the halogen which are continuously supplied.

3. The producing method according to claim 1, which comprises a filtration step of filtering the reaction solution containing the halogen oxyacid.

4. The producing method according to claim 1, which comprises a storage step of storing the reaction solution containing halogen oxyacid.

5. The producing method according to claim 4, wherein a pHI at 25° C. during storage in the storage step is from 12.0 or more and less than 14.0.

6. The producing method according to claim 1, wherein a pH of the organic alkali solution at 25° C. is 10.5 or more and 14.5 or less.

7. The producing method according to claim 1, wherein the organic alkali is onium hydroxide, and the halogen oxyacid is onium halogen oxyacid.

8. The producing method according to claim 7, wherein the onium hydroxide is quaternary ammonium hydroxide, and the onium halogen oxyacid is quaternary ammonium hypohalite.

9. The producing method according to claim 8, wherein the quaternary ammonium hydroxide is tetramethylammonium hydroxide, and the quaternary ammonium hypohalite is tetramethylammonium hypohalite.

10. The producing method according to claim 1, wherein the halogen is chlorine, bromine, hypochlorous acid, hypobromous acid, chlorous acid, bromous acid, chloric acid, or bromic acid.

* * * * *